United States Patent [19]

Zirps et al.

[11] 4,221,156
[45] Sep. 9, 1980

[54] HYDRAULIC LIFTING DEVICE FOR HARVESTING MACHINES

[75] Inventors: Wilhelm Zirps, Hemmingen; Hugo Preun, Asperg, both of Fed. Rep. of Germany

[73] Assignee: Robert Bosch GmbH, Stuttgart, Fed. Rep. of Germany

[21] Appl. No.: 936,602

[22] Filed: Aug. 23, 1978

[30] Foreign Application Priority Data

Sep. 21, 1977 [DE] Fed. Rep. of Germany ....... 2742424

[51] Int. Cl.³ ............................................ F15B 15/22
[52] U.S. Cl. ........................................ 91/407; 91/447
[58] Field of Search ................. 91/407, 405, 451, 445, 91/447

[56] References Cited

U.S. PATENT DOCUMENTS

| 4,051,766 | 10/1977 | Strouff | 91/451 |
| 4,163,412 | 8/1979 | Porter | 91/451 |

*Primary Examiner*—Paul E. Maslousky
*Attorney, Agent, or Firm*—Michael J. Striker

[57] ABSTRACT

The hydraulic lifting device for harvesting machines includes a hydraulic cylinder-piston unit mounted on the wheel frame of the machine and supporting most of the weight of the harvesting apparatus so that the latter abuts against the ground with residual weight only. The cylinder-piston unit is controlled by a multi-way selector valve and a locking valve unit connected in a first working pipeline system. The hydraulic device further includes a pressure limiting valve for setting a reference pressure for the hydraulic cylinder-piston unit, the limiting valve being connected in an additional working pipeline that is branched upstream the limiting valve to a nonreturn valve and therefrom is connected by a direct conduit to a hydraulic accumulator and the hydraulic cylinder-piston unit. The combination of the pressure limiting valve with the non-return valve and the branch conduit prevents during the lowering of the piston-cylinder unit the hydraulic accumulator from being completely discharged, accelerates the lowering movement and improves the seal of the entire lifting device.

6 Claims, 2 Drawing Figures

HYDRAULIC LIFTING DEVICE FOR HARVESTING MACHINES

BACKGROUND OF THE INVENTION

The invention relates generally to hydraulic lifting devices and more specifically relates to a hydraulic lifting device for use in connection with harvesting machines having a wheel frame and a harvesting apparatus such as a mowing table supported on the frame by a hydraulic cylinder-piston unit in such manner that the harvesting apparatus rests on the ground with its residual weight only. The hydraulic device is of the type having a multi-way control valve connected between a pressure fluid pump and a tank and having ports for selectively connecting by a first working pipeline the cylinder-piston units to a lifting or lowering position, and further including hydraulic accumulator and a locking valve unit for the cylinder-piston unit.

Conventional lifting devices of this type have a pressure limiting valve to safeguard a hydropneumatic energy accumulator and a locking valve for protecting the working position of the cylinder-piston unit, the locking valve unit being connected in series with a working pipeline leading from a multiway control valve to the cylinder-piston unit. In spite of the fact that the prior art hydraulic device insures a tight locking of the lifting cylinder-piston unit and during the lowering of the harvesting apparatus inhibits a complete discharge of the energy accumulator, it still has the disadvantage that the lowering process runs relatively slowly because the entire pressure fluid flow has to pass through the pressure limiting valve. Due to the fact that most of the weight of the harvesting apparatus has to be supported by the lifting pressure cylinder unit of the device, the pressure limiting valve is adjusted to such a valve that it is relatively close to the working pressure in the cylinder and consequently the pressure difference causing the discharge of the pressure fluid stream is relatively low. A further disadvantage is in that the pressure limiting valve when operating in proximity of its reference pressure does no longer perfectly seal and pressure fluid can leak into subsequently connected pipelines as far as to another closed valve seat.

SUMMARY OF THE INVENTION

It is therefore a general object of the present invention to overcome the aforementioned disadvantages.

More particularly, it is an object of the invention to provide an improved hydraulic lifting device for harvesting machines which not only prevents a complete unloading of the energy accumulator during the lowering of the harvesting apparatus but ensures also tight locking of the lifting piston cylinder unit, and in addition, provides for a relatively fast lowering process.

An additional object of the invention is to provide such an improved lifting device which is relatively simple in operation and has a particularly compact structure.

A further object of the invention is to provide an improved hydraulic lifting device wherein during the lowering of its working piston two successive speeds of the movement are automatically adjusted.

Another object of the invention is to provide an improved hydraulic lifting device for supporting a working part of the harvesting machine that during the operation on a soft soil makes it possible to lift for a short period of time the working part of the machine from its normal working position in which it rests on the soil by its residual weight in order to permit the slipping of the material that had accumulated and moved upwardly on that part due to its sliding movement on the ground.

The novel features which are considered as characteristic for the invention are set forth in particular in the appended claims. The invention itself, however, both as to its construction and its method of operation, together with additional objects and advantages thereof, will be best understood from the following description of specific embodiments when read in connnection with the accompanying drawing.

DESCRIPTION OF THE PREFERRED EMBODIMENTS

Figure 1:
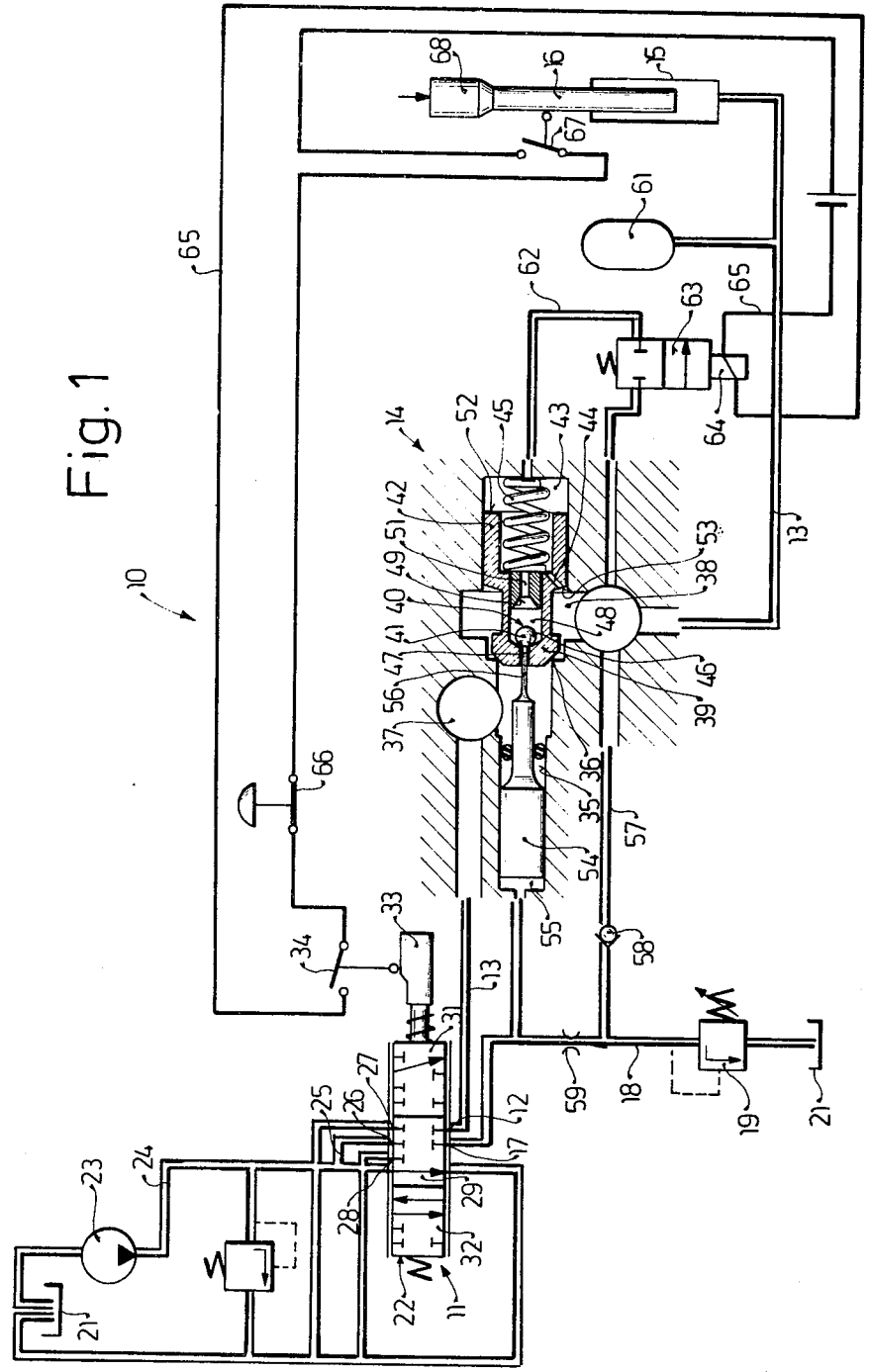
FIG. 1 is a simplified connection diagram of a hydraulic lifting device according to this invention for lowering and lifting the mower table of a combine harvester-thresher.

FIG. 1 shows a hydraulic lifting device 10 for lifting and lowering a mower table of a combine harvester-thresher and includes a multi-way three-position selector valve 11 having a piston 22 with passages for a neutral position 29, lifting position 31 and a lowering position 32. The selector valve 11 further includes a plurality of ports of which load port 12 is connected via a first working pipeline 13, and a preliminarily controlled locking unit 14 to a hydraulic cylinder 15 having a working piston 16. A second load port 17 of the selector valve 11 is connected via a second working pipeline 18 and a pressure limiting valve 19 to a tank 21. In the neutral position of the piston 22 of the selector valve 11 the passage 29 connects a recycling pipeline 24 from the pump 23 to the tank 21 where the pressure conduit 25 branches from an upstream portion of the recycling pipeline 24 to an inlet port 26 of the selector valve 11; furthermore, two return ports 27 and 28 are connected to the downstream part of the recycling pipeline 24 leading to the tank 21. As mentioned above, in the neutral position 29 as shown in FIG. 1 the recycling pipeline is open while both load ports 12 and 17 are closed; in a lifting position 31 of the piston 22, the inlet port 26 is connected to the first port 12 and the remaining ports are closed; in a lowering position 32 of the piston 22, the inlet port 26 is connected to the second load port 17 and the first load port 12 to the return port 27 while the remaining ports are closed. An extension of the piston 22 is provided with a cam 33 controlling by a cam follower an electrical switch 34 connected in the circuit of a solenoid valve 63. In the neutral and lifting positions of the selector piston 22 the cam 33 keeps the switch 34 open and closes the latter when the piston 22 is moved to a lowering position. A spring keeps normally the piston 22 in its neutral position at the center of the valve 11.

A locking valve unit 14 includes a housing having a successively stepped-up bore 35 defining a valve seat 36 situated between an inlet chamber 37 and a load chamber 38, both chambers being connected in series with the first working pipeline 13. The stepped bore 35 accommodates a master piston valve 39 which in turn comprises a preliminary control valve 40 including a ball-shaped auxiliary control member 41. The master piston valve 39 has a recessed end portion 42 of increased outer diameter delimiting with the end portion of the bore 35 a spring space 43 which communicates with the load chamber 38 via a preliminary control throttle bore 44 provided on the body of the master piston valve 39. The pressure spring 45 is arranged within the spring space 43 and urges the master piston valve 39 against the valve seat 36. In the position as shown in FIG. 1 the auxiliary control member 41 rests on a first valve seat 46 and closes a bore 47 leading into the inlet chamber 37. A second valve seat 49 is arranged in a control chamber 48 opposite the first valve seat 46 and a bore 51 passes through the valve seat 49 and connects the control chamber 38 to the spring space 43. The upper surface of the master piston valve 39 is provided with shoulders and recesses defining a first pressure area 52 directed into the spring space 43 and a second pressure area 53 directed into the load chamber 38. A piston 54 is arranged for movement against the master piston valve 39 in the other end portion of the stepped bore 35 and defines therein a pressure space 55. The end of the piston 54 facing the valve 39 is provided with a projecting plunger 56 which passes through a central bore 47 in the master piston valve 39. The diameters of the plunger 56 and of the bore 47 are so adjusted as to form together a throttling passage. The pressure space 55 communicates with an upstream portion of the second working pipeline 18. A cross conduit 57 branches from the second working pipeline 18 upstream of the pressure limiting valve 19 directly connected via a nonreturn valve 58 for safeguarding the hydraulic cylinder-piston unit 15, to the first working pipeline 13 in the range of the load chamber 38 between the locking unit 14 and the cylinder-piston unit 15. A restrictor 59 is provided in the second working pipeline 18 between the branches thereof leading to the pressure space 55 and to the cross conduit 57. A hydropneumatic energy accumulator 61 is connected to the first working conduit 13 to cushion the hydraulic cylinder-piston unit 15.

A pipeline 62 with a two-way two-position solenoid valve 63 connects spring space 43 to the load chamber 38, parallel to the preliminary throttle bore 44. The control member of the solenoid valve 63 is normally held by means of a spring in a closed position and is displaced by solenoid 64 to move into an open position. The solenoid 64 is connected in an electric circuit 65 in which are also connected in series a switch 34 controlled, as mentioned above, by the selector valve 11, a hand operated switch 66 and a switch 67 controlled by the piston of the hydraulic cylinder-piston unit 15. The last-mentioned switch 67 cooperates via a cam follower with a cam 68 provided at the outer end portion of the piston 16 of the cylinder-piston unit 15 so that this piston—shortly before reaching its lowermost end position—closes the normally open switch 67.

The operation of the lifting device 10 according to this invention is as follows:

Initially, operative pressure in the cylinder-piston unit 15 corresponds to the reference pressure that has been adjusted by the pressure limiting valve 19. With this working operative pressure the most part of the weight of the mowing table is carried by the cylinder-piston unit 15 while the mowing table rests with a relatively small residual weight on the ground. By this means the digging of the mowing table into the rising ground during the operation of the harvesting machine is prevented. The hydraulic cylinder piston unit 15 and the energy accumulator 61 are tightly locked both by the locking unit 14 and by the non-return valve 58. The arbitrarily actuated manual switch 66 is normally in the illustrated closed position whereas the switch 34 controlled by the selector valve 11 and the switch 67 controlled by the piston 16 of the cylinder-piston unit are normally opened so that the solenoid 64 of the valve 63 is disconnected from the electric power source also connected in the circuit 65, and the valve 63 is normally in its closing position as shown in the drawing. The pressure oil delivered by the pump 23 flows almost without pressure back to the tank 21 or it can be employed in a conventional manner for actuating other hydraulic loads (not shown) on the harvester thresher.

If the mowing table of the machine is to be lifted and the working piston 16 is to be driven outwardly from its cylinder 15, the selector piston 22 of the selector valve 11 is displaced to the left as far as to the lifting position 31 in which the inlet port 26 is connected to the first load port 12. In this lifting position of the selector valve 11 the pressure oil supplied from the pipe 23 enters the first working pipeline 13 and flows through the locking unit 14 into the energy accumulator 61 and the cylinder-piston unit 15 whereby the piston 16 of the unit is driven up. During the flow of the pressure fluid through the locking valve unit 14, the ball 41 of the auxiliary control valve abuts against the second valve seat 49 and the master piston valve 39 lifts off its seat 36 against the force of the spring 45. The master piston valve 39 together with its preliminary control valve 40 acts during the lifting condition of the device as a normal non-return valve that keeps open passage for the oil stream flowing to the cylinder-piston unit 15. In the lifting position of the selector valve 11 the second working pipeline 18 is closed so that the piston 54 retains its starting position as illustrated in the drawing. Furthermore, the electrical switch 34 is kept open by the cam 33 of the selector piston 22 and the solenoid valve 63 irrespective of the position of the switch 67 controlled by the working piston 16 remains in its shown closing position. The lifting process is completed by returning the selector piston 22 into its neutral position 29 in which the pump 23 is unloaded and the three valve seats 39, 41 and 58 shut-off the cylinder piston unit 15.

In order to lower the mowing table of the harvesting machine, the working piston 16 is driven into its cylinder 15 by displacing the selector piston 22 of the selector valve 11 to its lowering position 32 in which the recycling pipeline 24 is shut-off and the pressure oil delivered by pump 23 is supplied into the second working pipeline 18 through which it flows via the pressure limiting valve 19 to the tank 21. At the same time the first working pipeline 13 is pressure released through the return port 27 into the tank 21. Restrictor 59 in the second working pipeline 18 increases the reference pressure built up by the pressure limiting valve 19 about a value that is sufficient to displace in pressure space 55 the piston 54 to the right, referring to FIG. 1. During this displacement of the piston 54 its plunger 56 displaces the ball 41 of the preliminary control valve 40 from the first valve seat 46. Through the thus open passage 47, a larger amount of pressure fluid flows out from the spring space 43 into the inlet chamber 37 than it can flow from the load chamber 38 through the throttle bore 44 into the spring space 43. As a result pressure in the spring space 43 is reduced and the working pressure acting against the second pressure area 53 moves the master piston valve 39 still further to the right against the force of the spring 45. By this movement the communication between the load chamber 38 and the inlet chamber 37 is fully established and the sinking process can proceed at a rapidly increasing speed. During this fluid discharge also the pressure fluid from the energy accumulator 61 flows into the tank 21 so that the accumulator 61 becomes partially discharged. As long as the working pressure in cylinder-piston unit 15 is higher than the reference pressure at pressure limiting valve 19, the nonreturn valve 58 remains closed. If, however, the working pressure drops below the reference pressure, pressure fluid from the second working pipeline 18 starts flowing via the cross line 57 and the nonreturn valve 58 into the load chamber 38 and prevents the drop of the working pressure in the hydraulic cylinder-piston unit 15 below the reference pressure. The value of the reference pressure is selected such that most of the weight of the mowing table of the harvesting machine is supported by the hydraulic cylinder piston unit 16 and only minor residual weight portion of the mowing table is on the ground. The reference pressure is therefore adjusted to be slightly lower than the working pressure in the hydraulic cylinder-piston unit 15 during the lowering process and in the lowermost position of the piston, that means shortly before the abutment of the mowing table on the ground and during stationary conditions. Pressure fluid during the acceleration phase and in the lower lifting range of the working piston 16 flows, therefor, through the nonreturn valve 58, since according to kinematic conditions in the upper range of the lifting movement substantially increasing pressure is necessary. As a consequence the largest part of the pressure oil from the pump 23 flows through the tank 21 through the pressure limiting valve 19.

By shifting the selector piston 22 into its lowering position 32 the electric switch 34 is simultaneously closed. Since the hand operated switch 66 is normally also closed the solenoid 64 is actuated solely upon the actuation of the switch 67 by the working piston 16. The actuation of solenoid 64 is therefore dependent on the travel of the working piston 16 and consequently dependent on the relative position of the mowing table to the wheel frame of the harvester thresher. It will be now assumed that the switch 67 is closed at the lower range of the cam 68 only when the mowing table is spaced about 200 mm above the ground level. In this position of the mowing table the solenoid valve 63 is switched over into its open position in which the spring space 43 is immediately connected to the load chamber 38. As a consequence the preliminary control throttle 44 becomes uneffective and the working pressure built up in the spring space 43 presses together with the spring 45 the master piston valve 39 against its valve seat 36. Due to the fact that piston 54 continues to remain in its right-hand end position, its plunger 56 keeps the auxiliary ball 41 at a distance from the first valve seat 46. Consequently, the lowering process proceeds substantially more slowly since pressure fluid from cylinder piston unit 15 and from the energy accumulator 61 can escape into the inlet chamber 37 and therefrom into the tank 21 only after being throttled by the conduit 62 of the preliminary control throttle 44, the spring space 43, the boring 51, the control chamber 48 and the boring 47. By suitable design of the outer diameter of the plunger 46 the magnitude of the effective annular passage in the boring 47 is determined. As long as the selector piston 22 remains in its lowering position, the working pressure within the hydraulic cylinder piston unit 16 cannot drop below the reference pressure supplied by the pressure limiting valve 19 so that the operator of the harvester-thresher during the lowering action can direct its attention to other controlling activity without the danger that the mowing table digs into the ground or that the energy accumulator becomes completely emptied and that the subsequent lifting operation could be started only with delays.

In order to end the lowering process the selector 22 is returned into its neutral position 29 whereby the pressure in pressure space 55 is relieved and the auxiliary control member or ball 41 is pressed against the first valve seat 46. Working pressure in the hydraulic cylinder piston unit 15 remains constant over a prolongated time period. If, however, the working pressure in the cylinder 15 drops because of some leakage, so it can be restored to the level of the reference pressure by actuating momentarily the selector valve 11 into its lowering position 32.

If it is desired to accelerate the lowering process also in the lower lifting range in which the piston actuated switch 67 is closed, in addition to placing the selector piston 22 in its lowering position 32, the hand operated switch 66 is momentarily open. The solenoid valve 63 in spite of the closed piston operated switch 67 now remains in its closing position and consequently the master piston valve 39 is fully opened during the lowering movement. Only upon closing the hand operated switch 66 pressure fluid is automatically fed into the energy accumulator 61 and pressure needed for partially unloading the mowing table will build up.

In this manner a hydraulic lifting device 10 will result in which upon completion of the lowering step the force needed for partially supporting the mowing table on the ground is automatically adjusted and kept on a correct value whereby the lowering movement can proceed at a substantially increased speed with respect to conventional devices and the hydraulic cylinder-piston unit remains tightly locked.

Figure 2:
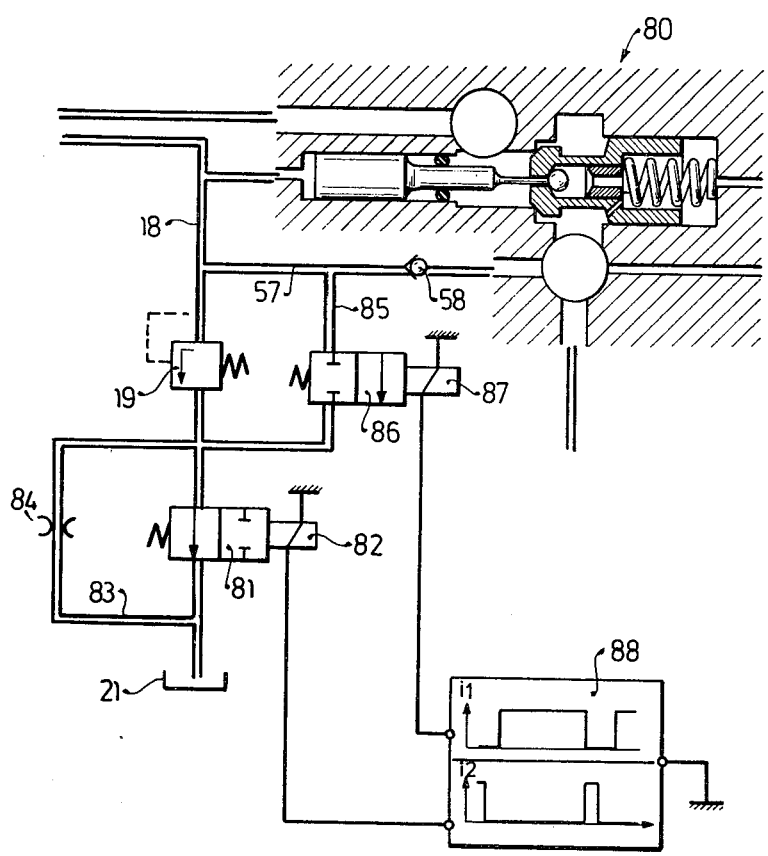
FIG. 2 is a part of another embodiment of the hydraulic lifting device suitable for application in a harvester machine operating on soft soil.

FIG. 2 shows a modified part 80 of the hydraulic lifting device of FIG. 1 in which corresponding parts have been indicated by like reference numerals. The modified embodiment differs from the embodiment of FIG. 2 as follows:

In the modified embodiment of the control device 80 a second two-way two-position solenoid valve 81 is connected in an upstream portion of the second working pipeline 18 behind the pressure limiting valve 19; the control piston of the valve 81 is held by means of a spring in its opening position and is actuated by means of a solenoid 82 to move into its closed position. Parallel to the solenoid valve 81 is connected to the second working pipeline 18 a bypass conduit 83 including a throttling restrictor 84. A second bypass conduit 85 is connected via a third two-way two-position solenoid valve 86 between the cross conduit 57 and the portion of the second working pipeline 18 between the pressure limiting valve 19 and the second solenoid valve 81, thus bypassing the pressure limiting valve 19. The control piston of the third solenoid valve 86 is spring biased into the closed rest position and is actuable by a solenoid 87 to take an open position. Solenoids 82 and 87 are energized by an electrical impulse generator 88 generating impulses $i_1$ and $i_2$.

The operation of the lifting device 80 is in principle the same as the operation of the lifting device 10, but because of the additional solenoid valves 81 and 86 controlled by the impulse generator 88 it can be applied with particular advantage in special application cases. For example in harvester-threshers which operate on soft soils such as swamps or sandy soils the problem occurs that the residual weight with which the mowing table rests on the ground is still too large and loose soil is shifted and accumulated before the cutting paper of the mowing table resulting in clogging of the cutter. The clogging can be substantially reduced when the mowing table is temporarily lifted and subsequently lowered so that the accumulated loose soil can slide below the mowing table. By increasing the frequency of such instantaneous lifting motions in which the lift can be reduced to minimum the danger of congestion of the cutting part is held to a minimum. By means of the impulse generator 88 the solenoid valves 81 and 86 are controlled in such a manner that the momentary lifting and lowering of the mowing table is carried out automatically whereby complete drain or discharge of the hydraulic accumulator 61 and the drop of the working pressure in the hydraulic cylinder-piston unit below the reference pressure defined by the pressure limiting valve 19 is avoided.

In particular the lifting device 80 operates as follows:

If the impulse generator 88 is disconnected, the second solenoid valve 81 is in its open position and the third solenoid valve 86 is in its closed position as illustrated in FIG. 2 and the lifting device 80 operates in the same manner as the device 10 in the example of FIG. 1.

If soft soil is encountered during the operation of the harvesting machine the selector piston 22 of the selector valve 11 is displaced into the lowering position 32 and the impulse generator is switched on. While one of the solenoids, for example solenoid 87 remains without current, the solenoid 82 of the second solenoid valve 81 receives an impulse $i_2$ and switches the valve into its closed position. As a result the reference pressure produced by the pressure limiting valve 19 is increased about an amount defined by the flow resistance of the throttle 84. Pressure oil delivered from the pump 23 through the second working pipeline 18 flows down through the cross pipeline 57 and the nonreturn valve 58 to the hydraulic energy accumulator 61 and to the hydraulic cylinder piston unit 15 whereby the working piston 16 during its outward movement lifts the mowing table. The magnitude of the pressure increase is determined by the throttle 84. Upon termination of the impulse $i_2$ the solenoid 82 is again deenergized, the spring bias solenoid valve 81 is returned to its open position and the throttle 84 is no longer effective. As a consequence the pressure in the part of the second working pipeline 18 upstream of the pressure limiting valve 19 drops again to the reference pressure. The working pressure in the hydraulic cylinder piston unit 15 builds up to the same pressure magnitude via the locking unit 14 and the selector piston 22 that has been set in its lowering position 32.

With the rise of an impulse $i_1$ the solenoid valve 86 is switched over to its open position and the pressure oil delivered by the pump 23 flows through the second working pipeline 18, the cross conduit 57, the second bypass conduit 85, the third solenoid valve 86 and the second solenoid valve 81 that is in its open position, to the tank 21. The pressure in pressure space 55 drops and the locking unit 14 locks hydraulically the working piston 16 in its position. By unloading the pump 23 the heating of the circulating oil is kept low in an advantageously simple manner. The drop of the impulse $i_1$ coincides with the rise of the impulse $i_2$. The length of respective impulses and their time rates can be in any suitable manner adjusted in the impulse generator 88 according to momentary circumstances.

It will be understood that each of the elements described above, or two or more together, may also find a useful application in other types of constructions differing from the types described above.

While the invention has been described and illustrated as embodied in a hydraulic control device for use with a harvesting machine, it is not intended to be limited to the details shown, since various modifications and structural changes may be made without departing in any way from the spirit of the present invention. For example, instead of hydropneumatical cushioning of the mowing table by means of the hydraulic energy accumulator 61 it is possible to employ also a purely mechanical cushioning in which a helical spring is connected between the mowing table and the working piston 16. Also, instead of the locking unit 14 as shown in the preferred embodiments, other types of locking units can be used that have for example a spring biased preliminary control valve. The construction of the locking unit using preliminary control members is particularly advantageous inasmuch as it results in a compact structure; nonetheless, also a locking unit without the preliminary control members is applicable. The throttle 59 shown in FIG. 1 contributes to a compact construction of the locking unit by increasing pressure in the pressure space 55 and the result it keeps the necessary pressure areas on the piston 54 small. The device of this invention, however, can operate also without such throttling means. Also, the throttle 84 shown in FIG. 2 can be dispensed with and pressure increase can be made by the length of the impulse $i_2$ only.

Obviously, the locking unit 14 can be incorporated into the housing of the selector valve 11. Instead of controlling solenoid valves 63 in response to the working piston operator switch 67 this control can be made also in response to a sensor arranged on the mowing table and slidably moving on the ground, or in response to other operational parameters.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, particularly the fast lowering action of the working part of the machine the speed of which is further adjustable in response to operational parameters of the machine.

What is claimed as new and desired to be protected by Letters Patent is set forth in the appended claims:

1. In a hydraulic lifting device for a working part of a harvesting machine, including a pump, a tank, a hydraulic cylinder-and-piston unit coupled to said working part to support most of the weight of the latter, a multiway control valve for selectively controlling the lifting and lowering positions of said cylinder-and-piston unit, a combination comprising a first working pipeline system including a locking valve unit connected between said control valve and said cylinder-and-piston unit; an energy accumulator connected to said first working pipeline system between said locking valve unit and said cylinder-and-piston unit for cushioning the operation of the latter; a second working pipeline system connected to said pump when said control valve is set in the lowering position, said second pipeline system including a pressure limiting valve arranged between said control valve and said tank for setting a control pressure for said locking valve unit, and a cross conduit including a non-return valve connected between said pressure limiting valve and said cylinder-and-piston unit to safeguard the lifting position of the latter.

2. A combination as defined in claim 1 wherein said locking valve unit includes auxiliary control means, a plunger controlling said control means, and a pressure space connected to said pressure limiting valve and controlling the movement of said plunger.

3. A combination as defined in claim 2 further including flow restrictor connected in said second pipeline system upstream of said pressure limiting valve between said nonreturn valve and said pressure space of said locking valve unit.

4. A combination as defined in claim 2 wherein said locking valve unit further includes a pressure fluid inlet chamber and a load chamber connected in said first pipeline system, a spring biased master piston valve for controlling the communication between said inlet chamber and said load chamber, said master control valve including a spring space accommodating a biasing spring and communicating with the load chamber through a preliminary control throttle and having pressure areas both in said load chamber and said spring space.

5. A combination as defined in claim 4 wherein said locking valve unit further includes bypass conduit connecting via a normally closed additional selector valve, said spring space to said load chamber parallel to said preliminary control throttle.

6. A combination as defined in claim 5 wherein said additional selector valve is a two-way two-position solenoid valve having a solenoid connected in an electrical circuit, said electrical circuit including series connected first switch actuated by the piston of said hydraulic cylinder piston unit and a second switch actuated by the piston of said multiway selector valve.

* * * * *